(12) United States Patent
Schmitz et al.

(10) Patent No.: US 12,179,613 B2
(45) Date of Patent: Dec. 31, 2024

(54) VEHICLE, METHOD, DEVICE AND STEERING SYSTEM FOR A VEHICLE

(71) Applicant: ZF Friedrichshafen AG, Friedrichshafen (DE)

(72) Inventors: Holger Schmitz, Gelsenkirchen (DE); Alexander Gaschka, Essen (DE); Thorsten Wilhelm Hestermeyer, Leverkusen (DE); Jochen Scherbart, Cologne (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 270 days.

(21) Appl. No.: 17/570,792

(22) Filed: Jan. 7, 2022

(65) Prior Publication Data

US 2022/0219550 A1 Jul. 14, 2022

(30) Foreign Application Priority Data

Jan. 8, 2021 (DE) .......................... 102021200106.8

(51) Int. Cl.
*B60L 50/60* (2019.01)
*B60K 1/02* (2006.01)
*H02J 7/00* (2006.01)

(52) U.S. Cl.
CPC ............... *B60L 50/66* (2019.02); *B60K 1/02* (2013.01); *H02J 7/0024* (2013.01)

(58) Field of Classification Search
CPC .......... B60L 50/66; B60L 1/00; B60L 3/0046; B60L 3/0084; B60L 58/21; B60K 1/02; H02J 7/0024; H02J 2310/40; H02J 7/0029; H02J 7/1423
See application file for complete search history.

(56) References Cited

U.S. PATENT DOCUMENTS

| 4,349,148 A | * | 9/1982 | Liberto | F24H 15/208 236/11 |
|---|---|---|---|---|
| 4,694,194 A | * | 9/1987 | Hansel | H02J 9/061 307/64 |
| 10,889,201 B2 | * | 1/2021 | Wataru | H02J 7/342 |
| 2008/0177444 A1 | * | 7/2008 | Tachibana | B62D 5/0475 701/41 |

(Continued)

FOREIGN PATENT DOCUMENTS

| DE | 10055531 A1 | 1/2002 |
|---|---|---|
| DE | 102013204894 A1 | 9/2014 |

(Continued)

*Primary Examiner* — B M M Hannan
(74) *Attorney, Agent, or Firm* — Kristin L. Murphy (57) ABSTRACT

The present disclosure relates to a vehicle, a method, a device and a steering system for a vehicle. In particular, the disclosure relates to a device for a vehicle with a first direct voltage source and at least one second direct voltage source, which are connected in series, for operating a consumer in the vehicle. The device comprises a potential tap which is designed to tap a potential between the first and the second direct voltage source. The device further comprises a circuit which is designed to provide the potential tapped between the first and the second direct voltage source for operating the consumer in the event of a fault in the first or second direct voltage source.

16 Claims, 6 Drawing Sheets

(56) References Cited

U.S. PATENT DOCUMENTS

| | | | | |
|---|---|---|---|---|
| 2011/0015828 A1* | 1/2011 | Shimizu | ................. | H02P 27/06 |
| | | | | 701/43 |
| 2013/0106320 A1* | 5/2013 | Yugo | ...................... | B60L 58/14 |
| | | | | 318/139 |
| 2018/0219407 A1* | 8/2018 | Nakamura | ................ | H02J 1/08 |
| 2019/0220027 A1* | 7/2019 | Nakayama | .......... | B60W 50/045 |

FOREIGN PATENT DOCUMENTS

| | | | | |
|---|---|---|---|---|
| DE | 102017011856 A1 | | 6/2019 | |
| DE | 102018131363 A1 | | 6/2020 | |
| JP | 2004282844 A | * | 10/2004 | |
| JP | 2007125915 A | * | 5/2007 | |
| JP | 2007153107 A | * | 6/2007 | ........... B62D 5/0457 |
| JP | 2009120086 A | * | 6/2009 | |
| JP | 2009166653 A | * | 7/2009 | |
| JP | 2009248885 A | * | 10/2009 | |
| JP | 2010023821 A | * | 2/2010 | ........... B62D 5/0481 |
| KR | 101557230 B1 | * | 10/2015 | |
| KR | 20170004665 A | * | 1/2017 | |
| WO | WO-2009110533 A1 | * | 9/2009 | ........... B62D 5/0481 |

\* cited by examiner

VEHICLE, METHOD, DEVICE AND STEERING SYSTEM FOR A VEHICLE

This application claims priority to German Patent Application No. 102021200106.8, filed Jan. 8, 2021, the disclosure of which is incorporated herein by reference in its entirety.

TECHNICAL FIELD

The present disclosure relates to a vehicle, a method, a device and a steering system for a vehicle. In one exemplary arrangement, the present disclosure relates to a concept for operating a power consumer of a vehicle with a first and a second direct voltage source.

BACKGROUND

A plurality of direct voltage sources can be used in vehicles to power consumers. Examples of such consumers are an electric power steering system and an electric power air conditioning compressor for an air conditioning system in the vehicle. In trucks, for example, two batteries connected in series are used to operate a steering system and other consumers in the truck. A malfunction of one of the batteries can lead to a loss of function of the steering system and/or the other power consumers.

In order to prevent the loss of functionality, well-known concepts in accordance with the so-called "dual lane strategy" provide for an additional and redundant vehicle electrical system with additional batteries and connections for the steering system and the other consumers. Implementing such an additional, redundant vehicle electrical system leads to a higher demand for resources (for example time, money, material, installation space, development effort).

There is therefore a need for an improved concept for operating a consumer in the vehicle.

SUMMARY

The subjects of the attached independent and dependent claims take this need into account.

Exemplary arrangements disclosed herein provide a device for a vehicle with a first and at least one second direct voltage source, which are connected in series, for operating a consumer in the vehicle. The device comprises a potential tap which is designed to tap a potential between the first and the second direct voltage source. Furthermore, the device comprises a circuit which is designed to provide the potential tapped between the first and the second direct voltage source for operating the power consumer in the event of a fault in the first or second direct voltage source.

The vehicle is to be understood as meaning, for example, a passenger car, a truck, an omnibus, a motorcycle, an airplane, a watercraft and the like. The first and the second direct voltage source each comprise, for example, one or more batteries, battery cells, generators or a combination of these.

The potential tap comprises, for example, an (electrical) connection on or between the first and/or second direct voltage source for providing the (electrical) potential between the first and the second direct voltage source.

The circuit can provide the potential for a voltage for operating the power consumer, for example. This allows, for example, the power consumer to continue to operate in the event of a fault in the first or the second direct voltage source and thus to at least partially maintain a function of the power consumer.

The power consumer is, for example, a steering system, an air conditioning compressor or another consumer in the vehicle. In general, the concept described herein can be used to operate a plurality of power consumers.

The circuit can be designed to provide the potential for a voltage of the tapped potential with respect to a pole of the first or the second direct voltage source for operating the power consumer by the voltage. As a result, in the event of a fault (for example, while the vehicle is driving), the power consumer can (continue to) be operated with the voltage of the first or second direct voltage source.

The circuit can also be designed to determine whether the first or the second direct voltage source has a fault. In the event of a fault, this allows the power consumer to switch adaptively/automatically from operation using the first and second direct voltage source to operation using the tapped potential. In addition, in the event of a fault, this also allows measures to be taken for power consumers to operate using the potential tapped between the first and second direct voltage source. Optionally, this also allows a driver of the vehicle to signal the error.

In some exemplary arrangements, the circuit is designed, in the event of a fault in the first direct voltage source, to provide the potential for a voltage of the tapped potential with respect to a pole of the second direct voltage source for operating the power consumer by the voltage with respect to the pole of the second direct voltage source and, in the event of a fault in the second direct voltage source, to provide a voltage of the tapped potential with respect to a pole of the first direct voltage source for operating the power consumer by the voltage with respect to the first direct voltage source. In this way, the power consumer can continue to be operated both in the event of a fault in the first and in the event of a fault in the second direct voltage source.

The potential tap can be designed to tap the potential between a positive pole of the first direct voltage source and a negative pole of the second direct voltage source. A negative pole of the first direct voltage source can have a reference potential of the vehicle. Furthermore, the circuit can be designed to provide the potential for a voltage of the tapped potential with respect to the reference potential of the vehicle for operating the power consumer by the voltage relative to the reference potential in the event of a fault in the second direct voltage source. The reference potential corresponds, for example, to the "ground" of the vehicle.

In some exemplary arrangements, the circuit is also designed to provide the potential tapped between the first and the second direct voltage source for operating an electric power steering system of the vehicle in the event of a fault in the first or second direct voltage source. As a result, the function of the steering system for the vehicle, for example power steering assistance by the steering system, can be maintained at least partially or to a limited extent.

Further exemplary arrangements provide a steering system for a vehicle with a first and at least one second direct voltage source, which are connected in series, as well as with the device proposed herein for providing a potential tapped between the first and the second direct voltage source connected in series to the first direct voltage source. The steering system comprises a drive which is designed to power the steering system with the potential tapped between the first and the second direct voltage source.

Further exemplary arrangements provide a vehicle with a first and at least one second direct voltage source, which are connected in series, as well as with the device proposed herein.

The first and the second direct voltage source can each comprise at least one lead-acid battery or a lithium-ion battery for providing a direct voltage.

In one particular exemplary arrangement, the first and the second direct voltage source can be designed to provide the same direct voltage. The direct voltage sources each provide a voltage of 12 volts, for example. Optionally, the direct voltage sources can also each provide a different voltage other than 12 volts.

In one particular exemplary arrangement, the first and/or the second direct voltage source can be designed to provide a direct voltage between 10 volts and 14 volts. This allows vehicle consumers to operate with a nominal voltage between 10 and 14 volts.

The vehicle may further comprise the steering system proposed herein. This offers, for example, power steering assistance for a driver of the vehicle. The device proposed herein provides that the power steering assistance can at least partially be maintained even in the event of a fault.

Further exemplary arrangements provide a method for a vehicle with a first and at least one second direct voltage source, which are connected in series, for operating a consumer in the vehicle. The method comprises tapping a potential between the first and the second direct voltage source. Furthermore, the method comprises providing the potential tapped between the first and the second direct voltage source in the event of a fault in the first or second direct voltage source for operating the power consumer.

Exemplary arrangements also provide a method for a steering system of a vehicle with a first and at least one second direct voltage source, which are connected in series, as well as with the device proposed herein for providing a potential tapped between the first and the second direct voltage source connected in series to the first direct voltage source. The method comprises powering the steering system with the potential tapped between the first and the second direct voltage source.

BRIEF DESCRIPTION OF THE DRAWINGS

Some examples of representative arrangements of the disclosure are explained in more detail below with reference to the accompanying drawings, simply by way of example. In the drawings.

DETAILED DESCRIPTION

Various exemplary arrangements will now be described in more detail with reference to the accompanying drawings, in which some arrangements are shown.

Although the exemplary arrangements can be modified and changed in various ways, the exemplary arrangements are shown in the drawings as examples and are described in detail herein. It should be made clear, however, that the intention is not to restrict the disclosure to the forms disclosed in each case, but rather that exemplary arrangements are intended to cover all functional and/or structural modifications, equivalents and alternatives that are within the scope of the disclosure.

Figure 1:
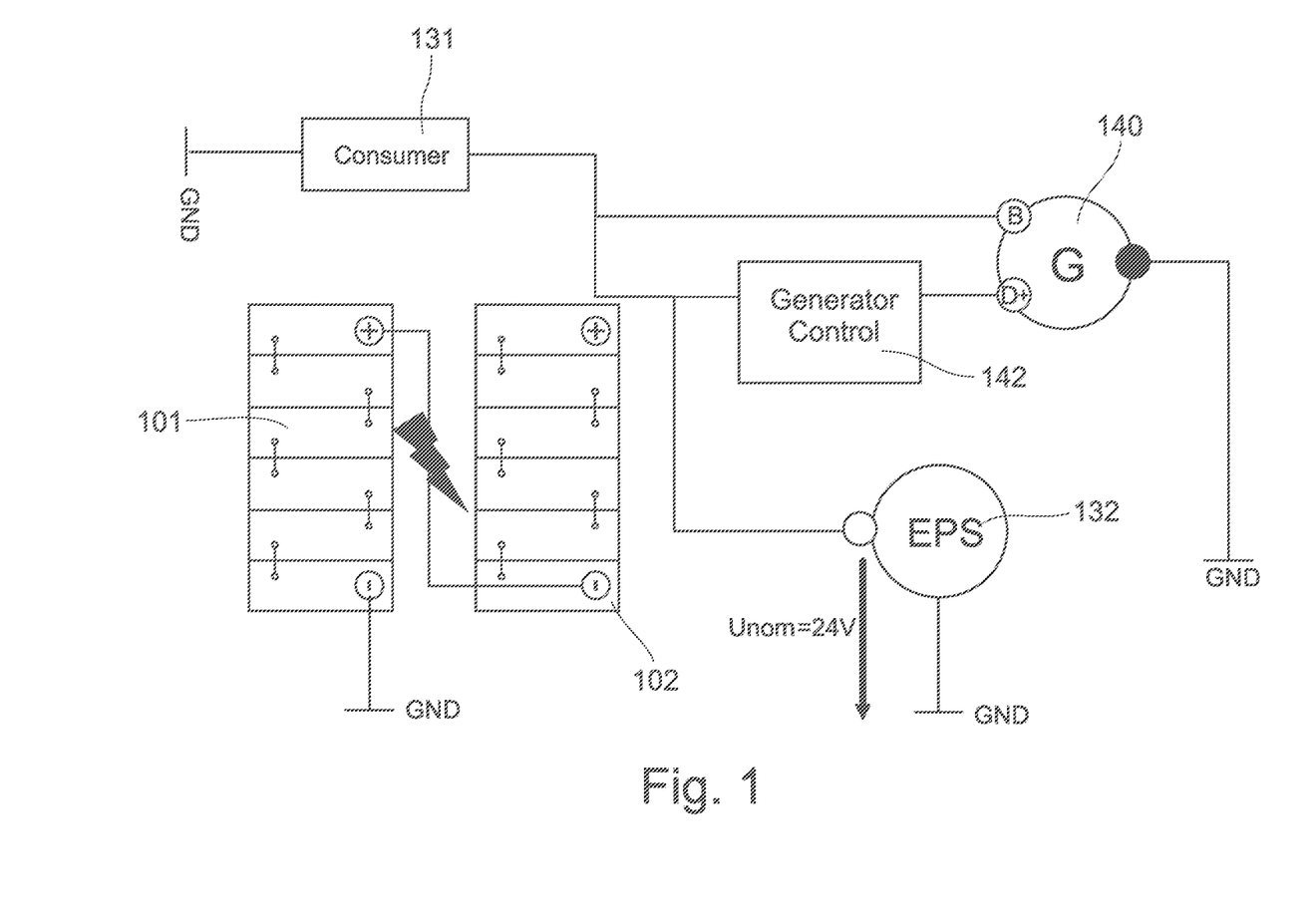
FIG. 1 shows a block diagram of a conventional electrical system of a vehicle.

FIG. 1 shows a block diagram of a conventional electrical system of a vehicle. The vehicle electrical system includes a first battery 101, and a second battery 102, which are connected in series, as well as consumers 131 and 132, which are operated by a voltage provided by the batteries 101 and 102. The consumer 132 is, for example, an electric steering system with electric power steering (EPS). The consumer 131 is, for example, an air conditioning compressor or an infotainment system in the vehicle.

The vehicle electrical system also comprises a generator 140 for charging the batteries 101 and 102 and a regulator 142 for regulating the generator 140, or a generator voltage and/or a generator current for charging the batteries 101 and 102.

As shown in FIG. 1, a negative pole of the first battery 101 has a reference potential GND of the vehicle. A positive pole of the first battery 01 is coupled to a negative pole of the second battery 102 for serial connection to the second battery 102. To operate the consumers 131 and 132, a potential applied to a positive pole of the second battery 102 is used for a voltage (Unom=24V) used to operate the consumers, this potential with respect to the reference potential GND. In the event of a fault, for example if the first or second battery 101 or 102 is defective or if the interconnection of the first and second batteries 101 and 102 is interrupted or disrupted, a circuit for operating the consumers 131 and 132 is interrupted. In the event of a fault, the consumers 131 and 132 will therefore fail. A failure of the steering system 132 can lead to the loss of the function of the steering system 132 and other consumers in the vehicle.

There is therefore a need for an improved concept for operating a consumer in the vehicle.

The exemplary arrangements described with reference to the drawings take this requirement into account.

Figure 2:
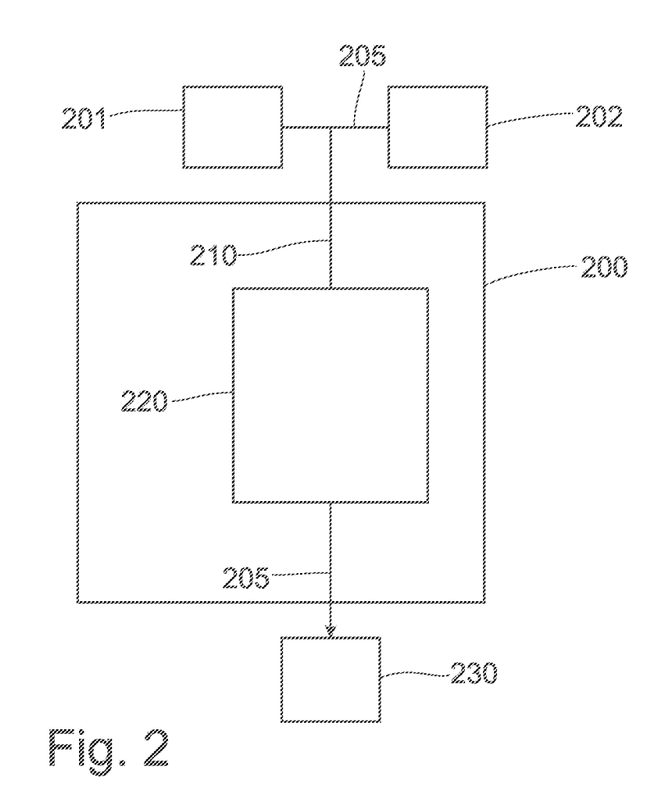
FIG. 2 shows a block diagram of an exemplary arrangement of a device for a vehicle for operating a consumer in the vehicle.

FIG. 2 shows a block diagram of an exemplary arrangement of a device 200 for a vehicle and in particular for a vehicle with a first direct voltage source 201 and at least one second direct voltage source 202, which are connected in series, for operating a consumer 230 in the vehicle. The device 200 comprises a potential tap 210 which is designed to tap a potential 205 between the first and the second direct voltage source 201 and 202. The device 200 further comprises a circuit 220 which is designed to provide the potential 205 tapped between the first and second direct voltage source 201 and 202 for operating the consumer 230 in the event of a fault in the first direct voltage source 201 or the second direct voltage source 202.

As a result, the function of the consumer 230 can also be operated in the event of a fault (if the first or the second direct voltage source 201 or 202 has a fault) in order to maintain a function of the consumer 230. The risk of failure of the consumer 230 can at least be reduced as a result. In particular, the probability of the failure of a consumer with a safety-critical function can be reduced and the safety of the vehicle can thereby be increased.

In one exemplary arrangement, the first and/or second direct voltage source 201 and/or 202 each comprise, for example, a battery or an accumulator (for example a lead-acid battery or lithium-ion battery). The failure of the first or second direct voltage source 201 or 202 causes, for example, an interruption in the circuit (for example within the first or second direct voltage source) for operating the consumer due to a defect in the first or second direct voltage source 201 or 202 or a connection (e.g. due to a cable break) to the circuit.

The potential 205 can be provided, for example, to apply a voltage (potential difference) to the consumer 230 in order to operate the consumer 230 with the applied voltage.

The circuit 220 comprises, for example, one or more electrical components and/or connections. In some exemplary arrangements, the circuit 220 comprises at least one connection to the consumer 230 for applying the voltage.

The circuit 220 is designed, for example, to provide the potential 205 for a voltage of the tapped potential 205 with respect to a pole (a potential of the pole) of the first or the second direct voltage source 201 or 202 for operating the consumer 230 by the voltage. A positive pole of the first direct voltage source 201 is connected to a negative pole of the second direct voltage source 202, for example for serial connection to the second direct voltage source 202. The potential 205 is tapped, for example, at the positive pole, the negative pole or between them. To provide a voltage (greater than zero) with respect to a pole of the first or the second direct voltage source 201 or 202, a voltage is provided, for example, with respect to a negative pole of the first direct voltage source 201 or a positive pole of the second direct voltage source 202. To operate the consumer 230, the voltage can be applied to the consumer 230 or a voltage input of the consumer 230.

In one exemplary arrangement, the circuit 220 can further be designed to determine whether the first or the second direct voltage source 201 or 202 has a fault. For this purpose, the circuit can, for example, compare a voltage of the potential 205 with respect to a pole of the first or second direct voltage source 201/202 with a reference value for the voltage, for example a nominal voltage of the first and second direct voltage source 201/202, and, depending on the deviation from the reference value/nominal voltage, determine whether the first or second direct voltage source 201 or 202 and/or which of these direct voltage sources 201 and 202 has a fault. In the event of a fault, this makes it possible to react depending on whether the first direct voltage source 201 or the second direct voltage source 202 has a fault. For example, if the first or second direct voltage source 201 or 202 has a fault, the direct voltage source 201 or 202 affected by the fault can be decoupled from the vehicle electrical system for safety reasons. Furthermore, as will be described below, depending on whether the first or second direct voltage source 201 or 202 has a fault, the potential 205 for providing a voltage with respect to a pole of the respective direct voltage source not affected by the fault can be provided.

The circuit 220 is designed, for example, in the event of a fault in the first direct voltage source 201, to provide the potential 205 for a voltage of the tapped potential 205 with respect to a pole of the second direct voltage source 202 for operating the consumer 230 by the voltage with respect to the pole of the second direct voltage source 202 and, in the event of a fault in the second direct voltage source 202, to provide a voltage of the tapped potential with respect to a pole of the first direct voltage source 201 for operating the consumer 230 by the voltage with respect to the first direct voltage source 201.

As in the example described above, for example, the positive pole of the first direct voltage source 201 is electrically conductively connected to the negative pole of the second direct voltage source 202 for serial connection to the second direct voltage source 202. According to the concept described above, the circuit 220 can, for example, if it detects a fault in the first direct voltage source 201, provide the potential 205 for a voltage with respect to the positive pole of the second direct voltage source 202, and if the circuit 220 detects a fault in the second direct voltage source 202, provide the potential 205 for a voltage with respect to the negative pole of the first direct voltage source 202.

To illustrate the proposed concept, said concept will be explained hereafter on the basis of exemplary applications of this concept in a vehicle.

Figure 3A:
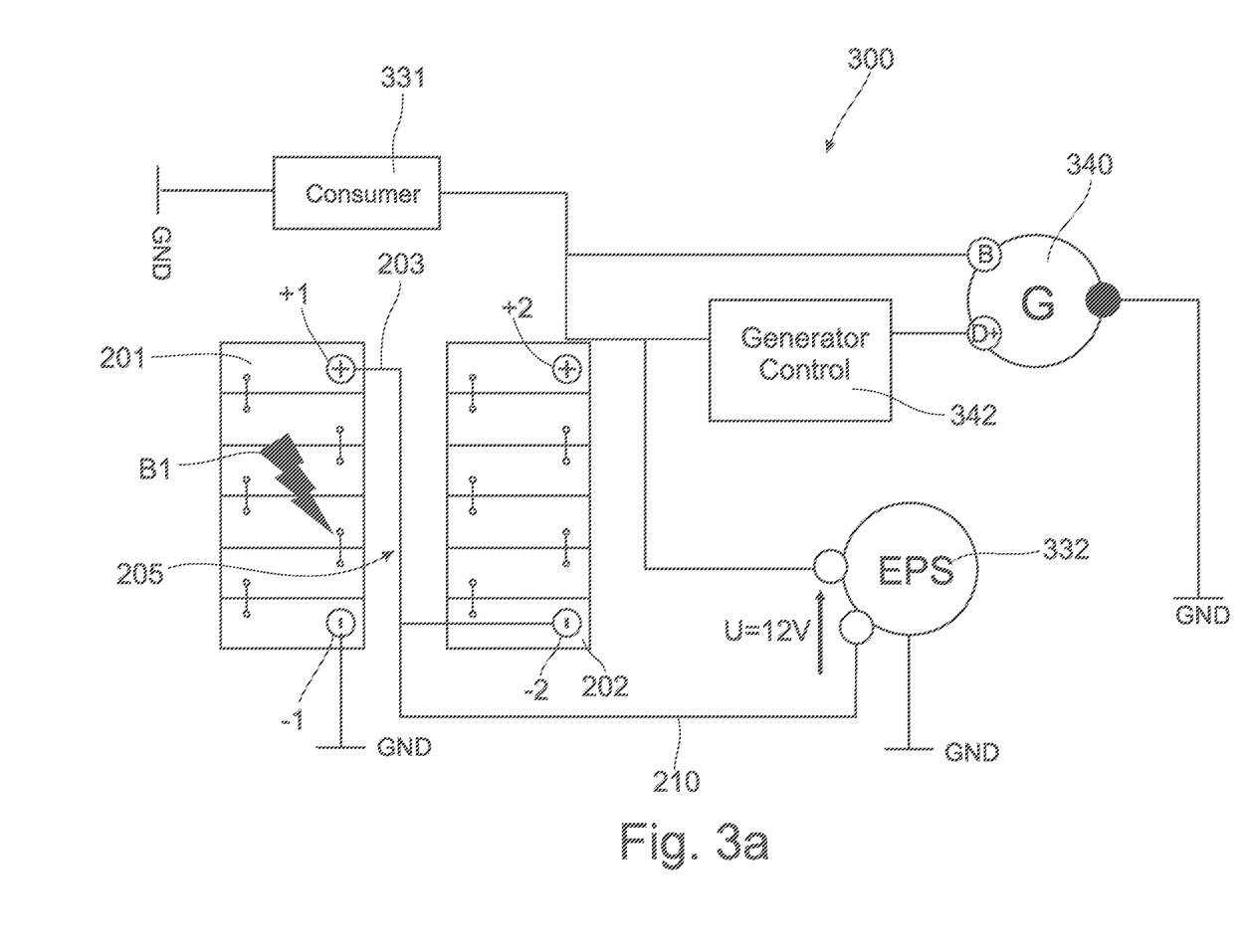
FIGS. 3a and 3b show applications of an exemplary arrangement of the device.
Figure 3B:
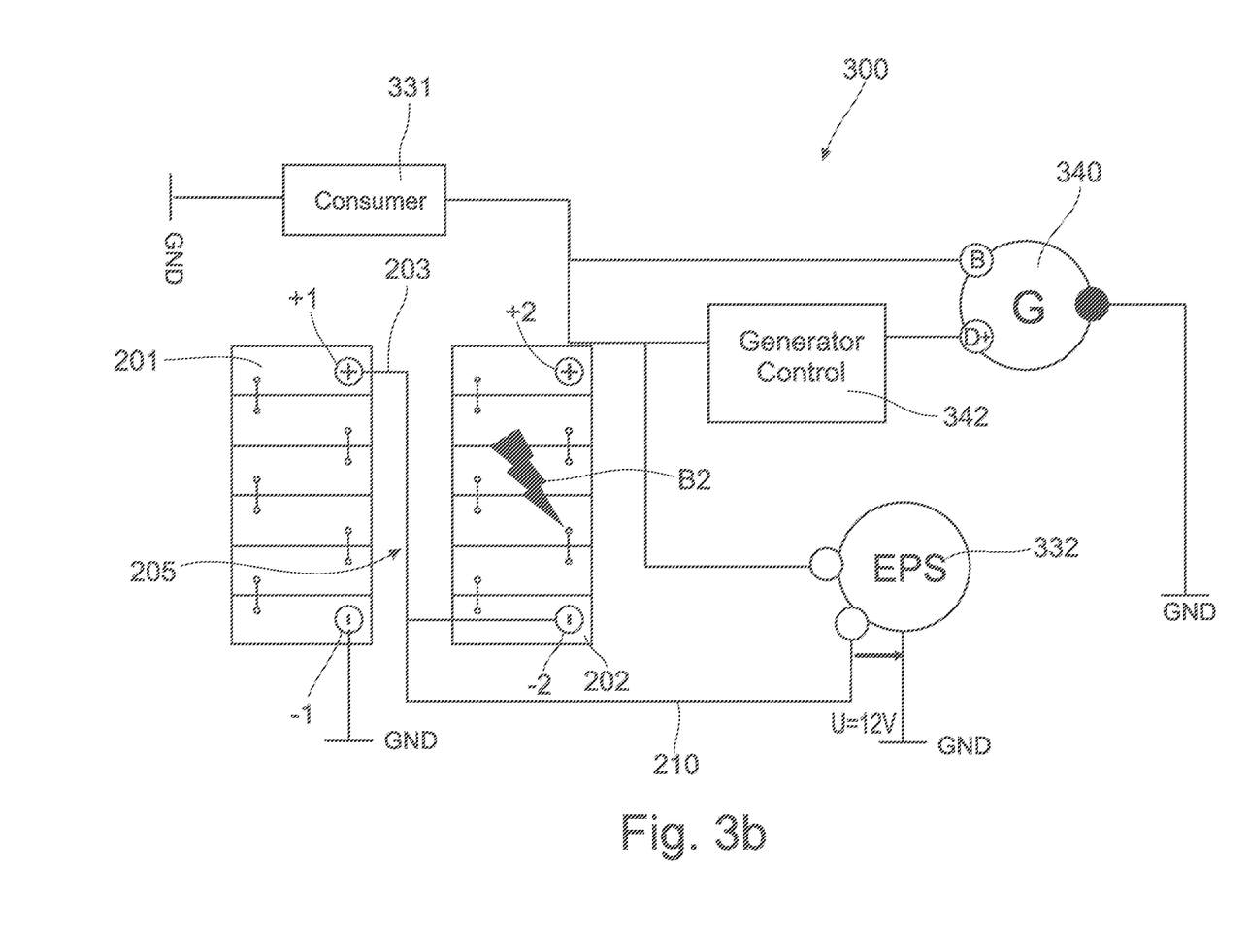

FIGS. 3a and 3b show, by way of example, applications of an exemplary arrangement of the device 200. In particular, FIGS. 3a and 3b each show a circuit diagram of a vehicle electrical system 300 for the schematic illustration of the applications. The vehicle electrical system 300 comprises a first battery as the first direct voltage source 201, a second battery as the second direct voltage source 202, a generator 340, a generator regulator 342 and a plurality of consumers 331 and 332. The consumer 331 is, for example, an air conditioning compressor or an infotainment system. The consumer 332 is, for example, an electric power steering system with electric power steering (EPS). Electric power steering includes, for example, an electrohydraulic or electromechanical drive for applying steering assistance through electric power steering. In other applications, the vehicle electrical system can comprise additional and/or other consumers.

The first and second batteries 201 and 202 are connected to one another in series via an electrically conductive connection or line 203. For this purpose, the line 203 connects a positive pole +1 of the first battery 201 to a negative pole −2 of the second battery 202. As a result, the poles +1 and −2 as well as the line 203 "lie" at the common potential 205. A negative pole −1 of the first battery 201 is connected to a reference potential GND, for example. GND can be understood as the "ground" of the vehicle electrical system 300. Furthermore, the consumers 331 and 332 are connected to the reference potential GND.

The voltage of the potential 205 with respect to the negative pole −1 of the first battery 201 and with respect to a positive pole of the second battery 202 corresponds in each case to an operating voltage of the first and the second battery 201/202. Since the first and second batteries 201 and 202 are connected in series, a total voltage present at the positive pole +2 of the second battery 202 with respect to GND corresponds to a sum of the operating voltages. The operating voltage of the first and second batteries 201 and 202 is between 10 and 14 volts, for example. The operating voltage is, for example, 12 volts in each case. In "fault-free" operation (when there is no fault in the first or second battery 201 or 202), it is provided that the consumers 331 and 332 are operated with the total voltage of, for example, 24 volts.

In order to at least partially compensate for discharging the first and second batteries 201 and 202 and to keep the total voltage constant at least within tolerable fluctuations, in one exemplary arrangement, the first and second batteries 201 and 202 can be charged by the generator 340. The generator regulator 342 is designed, for example, to control the generator 340 as a function of the total voltage and in such a way that the total voltage is kept at least within the scope of these fluctuations and the first and second batteries 201 and 202 are not "overcharged". In "fault-free" operation, the consumers 331 and 332 can be operated permanently with the total voltage of 24 volts in this way. For this purpose, the potential applied to the positive pole +2 is conducted via supply lines 350 to the suppliers 331 and 332 and thus the total voltage of 24 volts is applied to the consumers 331 and 332.

As indicated by lightning symbol B1 in FIG. 3a, in the first application shown in FIG. 3a, for example, the first battery 201 has a fault, so that a circuit for operating the consumers 331 and 332 is interrupted between −2 and GND. The fault occurs, for example, while driving and while the consumers 331 and 332 are being operated.

In order to at least continue operating the steering system 332 in the event of a fault, the potential 205 present between the first and second batteries 201 and 202 can be used to apply a voltage to the positive pole +2 on the steering system 332 by the potential tap 210. The circuit detects, for example, the fault in the first battery 201 and then provides the potential 205 by actuating a switch or equivalent component for applying the operating voltage of the second battery 202 to the steering system 332. In this way, the steering system 332 can continue to be operated with the operating voltage of the second battery (12 volts) in the event of a fault in the first battery 201.

The circuit is coupled, for example, to the potential tap 210 and implemented in the steering system 332. Optionally, the circuit can also be installed separately and outside of the steering system 332.

As indicated by lightning symbol B2 in FIG. 3b, in the second application shown in FIG. 3b, for example, the second battery 202 has a fault, so that the circuit for operating the consumers 331 and 332 is interrupted between +1 and +2. The circuit detects, for example, the fault in the second battery 201 and then provides the potential 205 by actuating the switch or equivalent component for applying the operating voltage of the first battery 202 to the steering system 332. As a result, the steering system 332 can continue to be operated with the operating voltage of the first battery (12 volts) even in the event of a fault in the second battery 202.

As a person skilled in the art will understand with knowledge of the present disclosure, the circuit can determine whether the first or the second battery 201 or 202 is faulty by comparing the potential 205 with a potential with respect to +2 and GND in the event of a fault and, depending on this, provide the potential 205 for either the voltage with respect to +2 or GND for operating the steering system 332. For this purpose, the circuit comprises, for example, at least one potentiometer circuit which is designed to compare the potential 205 with the potential present at the poles of the first and second batteries 201 and 202. Furthermore, the switch or an equivalent component of the circuit can be designed to (adaptively) provide the voltage of the potential 205 with respect to the pole +2 of the second battery 202 (the operating voltage of the second battery 202) in the event of a fault in the first battery 201, and to provide the voltage of the potential 205 with respect to GND (the operating voltage of the first battery 201) in the event of a fault in the second battery 201. In the event of a fault, depending on which of the batteries 201 and 202 is faulty, the circuit can switch over from "normal operation" using both batteries 201 and 202 in order to continue operating the steering system 332 with the operating voltage of the functional first or second battery 201/202.

The steering system 332 can accordingly be designed in such a way that it functions at least to a limited extent both when operated with the total voltage and when operated with the operating voltage of one of the first and second batteries 201 and 202. The circuit can also signal the fault to the steering system 332. This allows the steering system 332 to take measures for operation with the operating voltage of one of the first and second batteries 201 and 202. In other words, the steering system 332 can be switched from 24-volt operation to 12-volt operation.

The steering system 332 can therefore continue to operate in the manner described both in the event of a fault in the first battery 201 and in the event of a fault in the second battery 202 and the function of the electric power steering (for example, the power steering assistance provided by electric power steering) can thus be maintained at least to a limited extent. The function is maintained, for example, so that the vehicle can be steered at least to a (nearest) service station or to a specified destination in what is known as "limp home mode".

A key idea of the present disclosure can therefore be seen in creating a redundancy on an existing vehicle electrical system and enabling a minimized safety operation which enables a driver to perform any safety steering maneuvers in the event of a fault. The vehicle electrical system 300 can therefore also be understood as a "semi-redundant vehicle electrical system".

If both the first and the second direct voltage source have a fault/fail, the consumers 331 and 332 can be supplied exclusively by the generator 340. The circuit can be designed to reduce the power consumption of one or more of the consumers 331 and 332 in such a case in order to protect the generator 340 from overload.

In the case of trucks in particular (with a weight equal to or more than 3.5 tons), the electrical supply of the steering system and the power steering assistance provided by the steering system for control purposes may be absolutely necessary. The proposed concept can therefore bring about an improvement in safety, particularly in applications in trucks.

According to the principle described herein, one or more other consumers, for example an air conditioning compressor and/or an infotainment system, can alternatively or additionally be operated.

The concept/principle described herein can also be used in systems or vehicles with more than two direct voltage sources. In this case, a potential tap can be provided between the direct voltage sources and circuits assigned to the potential taps.

The principle described above can, as shown below, also be implemented in appropriate methods.

Figure 4:
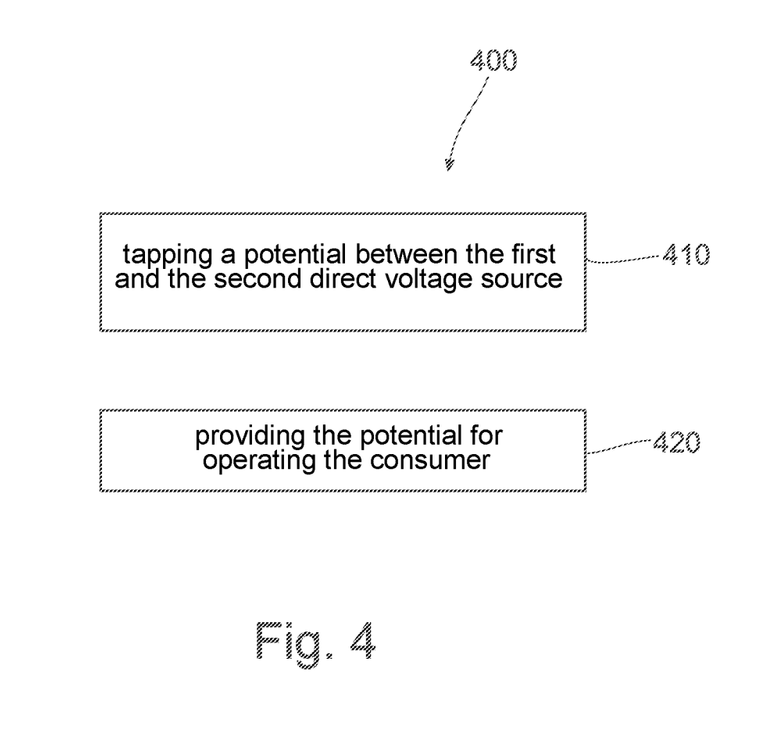
FIG. 4 shows a flowchart for the schematic representation of an exemplary arrangement of a method for a vehicle.

FIG. 4 shows a flowchart for the schematic representation of an exemplary arrangement of a method 400 for a vehicle and in particular for a vehicle with a first and at least one second direct voltage source, which are connected in series, for operating a consumer in the vehicle. The method 400 includes tapping 410 a potential between the first and the second direct voltage source. In addition, the method comprises providing 420 the potential tapped between the first and the second direct voltage source in the event of a fault in the first or second direct voltage source for operating the consumer.

In this way, the method 400 enables a function of the consumer to be maintained at least to a limited extent in the event of a fault in the first or the second direct voltage source.

Figure 5:
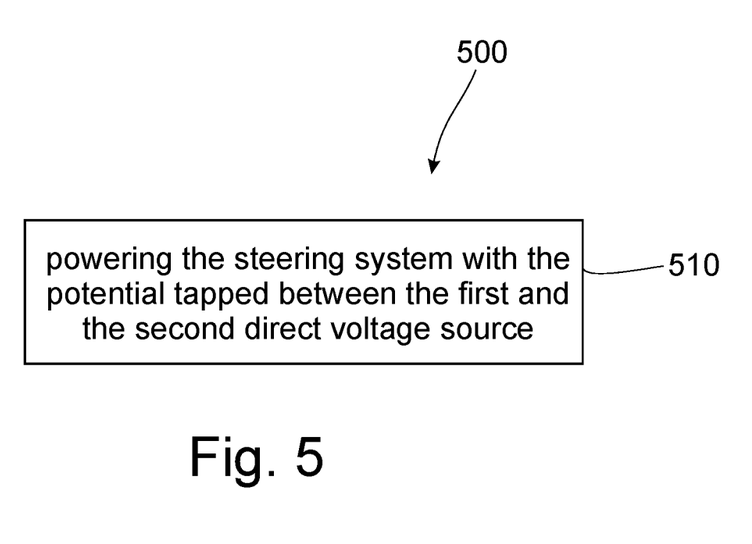
FIG. 5 shows a flowchart for the schematic representation of an exemplary arrangement of a method for a steering system.

FIG. 5 shows a flowchart for the schematic representation of an exemplary arrangement of a method 500 for a steering system of a vehicle with a first and at least one second direct voltage source, which are connected in series, as well as with the device proposed herein for providing a potential tapped between the first and second direct voltage source. The method 500 comprises powering 510 the steering system with the potential tapped between the first and the second direct voltage source.

The aspects and features that are described together with one or more of the previously detailed examples and drawings can also be combined with one or more of the other examples in order to replace an identical feature of the other example or to additionally introduce the feature in the other example.

Furthermore, the following claims are hereby incorporated into the detailed description, where each claim can stand on its own as a separate example. While each claim may stand on its own as a separate example, it should be noted that although a dependent claim in the claims may refer to a particular combination with one or more other claims, other examples may also include a combination of the dependent claim with the subject matter of any other dependent or independent claim. Such combinations are explicitly suggested herein unless it is indicated that a particular combination is not intended. Furthermore, features of a claim are also intended to be included for any other independent claim, even if that claim is not made directly dependent on the independent claim.

The invention claimed is:

1. A device for a vehicle with a first direct voltage source and a second direct voltage source for operating a consumer in the vehicle, wherein the first and the second direct voltage source are connected in series, the device comprising:
    a potential tap which is designed to tap a potential between the first and the second direct voltage source; and
    a circuit which is designed to provide the potential tapped between the first and the second direct voltage source for operating the consumer in the event of a fault in the first or second direct voltage source;
    wherein the circuit is designed, in the event of a fault in the first direct voltage source, to provide the potential for a voltage of the tapped potential with respect to a pole of the second direct voltage source for operating the consumer by the voltage with respect to the pole of the second direct voltage source and, in the event of a fault in the second direct voltage source, to provide a voltage of the tapped potential with respect to a pole of the first direct voltage source for operating the consumer by the voltage with respect to the first direct voltage source.

2. The device according to claim 1, wherein the circuit is designed to provide the potential for a voltage of the tapped potential with respect to a pole of the first or the second direct voltage source for operating the consumer by the voltage.

3. The device according to claim 2, wherein the circuit is further designed to determined whether the first or the second direct voltage source has a fault.

4. The device according to either claim 1, wherein the circuit is further designed to determine whether the first or the second direct voltage source has a fault.

5. The device according to claim 1, wherein the potential tap is designed to tap the potential between a positive pole of the first direct voltage source and a negative pole of the second direct voltage source, wherein a negative pole of the first direct voltage source has a reference potential of the vehicle, and wherein the circuit is designed, in the event of a fault in the second direct voltage source, to provide the potential for a voltage of the tapped potential with respect to the reference potential of the vehicle for operating the consumer by the voltage with respect to the reference potential.

6. The device according to claim 1, wherein the circuit is further designed to provide the potential tapped between the first and the second direct voltage source for operating an electric power steering system of the vehicle in the event of a fault in the first or second direct voltage source.

7. A steering system for a vehicle with a first direct voltage source and at least one second direct voltage source, wherein the first and the second direct voltage source are connected in series, and with a device according to claim 1 for providing a potential tapped between the first and the second direct voltage source connected in series to the first direct voltage source, the steering system comprising a drive which is designed to power the steering system with the potential tapped between the first and the second direct voltage source.

8. A vehicle with a first direct voltage source and at least one second direct voltage source, wherein the first and the second direct voltage source are connected in series, as well as with a device according to claim 1.

9. The vehicle according to claim 8, wherein the first and the second direct voltage source each comprise at least one lead-acid battery or a lithium-ion battery for providing a direct voltage.

10. The vehicle according to claim 9, wherein the first and the second direct voltage source are designed to provide the same direct voltage.

11. The vehicle according to claim 8, wherein the first and the second direct voltage source are designed to provide the same direct voltage.

12. The vehicle according to claim 11, wherein the first and/or the second direct voltage source are each designed to provide a direct voltage between 10 volts and 14 volts, separately.

13. The vehicle according to claim 8, wherein the first and/or the second direct voltage source are each designed to provide a direct voltage between 10 volts and 14 volts, separately.

14. The vehicle according to claim 8, further comprising a steering system comprising a drive which is designed to power the steering system with the potential tapped between the first and the second direct voltage source.

15. A method for a steering system of a vehicle with a first and at least one second direct voltage source, wherein the first and the second direct voltage source are connected in series, and a device according to claim 1 for providing a potential tapped between the first and the second direct voltage source connected in series to the first direct voltage source, the method comprising powering the steering system with the potential tapped between the first and the second direct voltage source.

16. A method for a vehicle with a first and at least one second direct voltage source for operating a consumer in the vehicle, wherein the first and the second direct voltage source are connected in series, comprising:
    tapping a potential between the first and the second direct voltage source; and
    providing the potential tapped between the first and the second direct voltage source for operating the consumer in the event of a fault in the first or second direct voltage source;
    wherein in the event the fault is in the first direct voltage source, providing the potential for a voltage res of the tapped potential with respect to a pole of the second direct voltage source for operating a consumer by the voltage with respect to the pole of the second direct voltage source and, in the event the fault is in the second direct voltage source, providing a voltage of the tapped potential with respect to a pole of the first direct voltage source for operating the consumer by the voltage with respect to the first direct voltage source.

* * * * *